3,285,689
MOTION PICTURE CAMERA

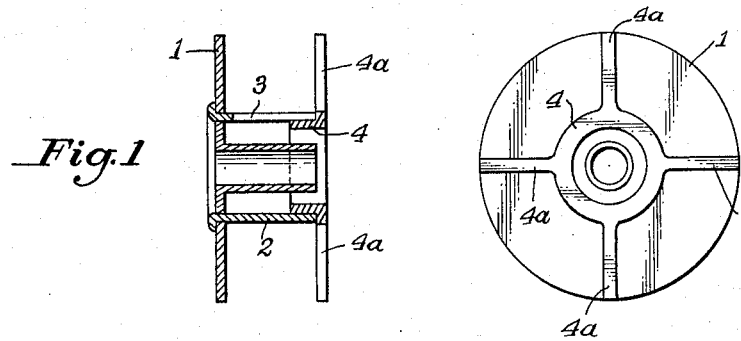
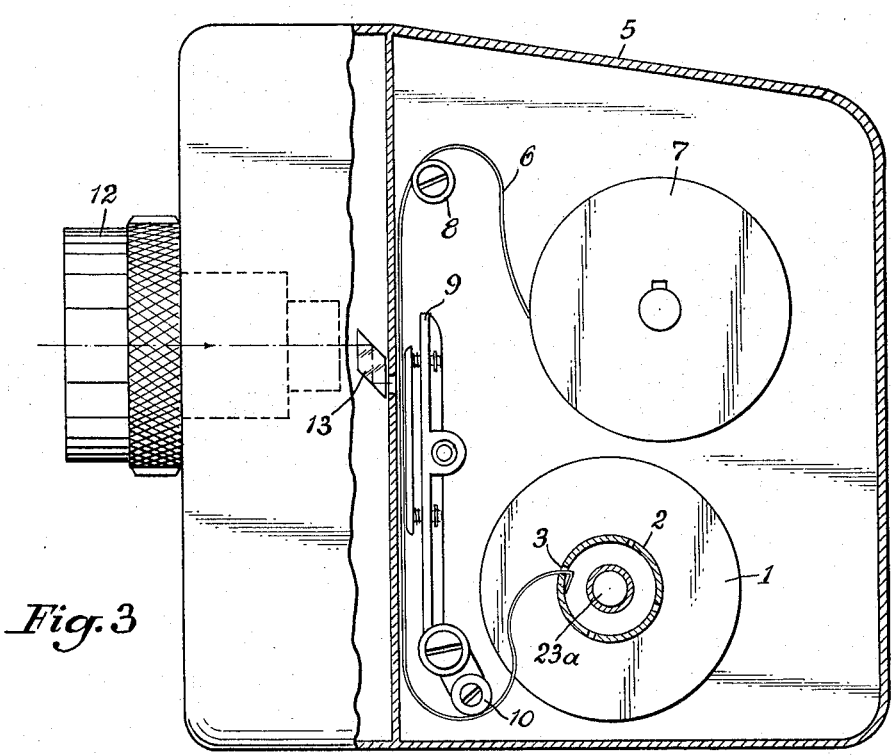
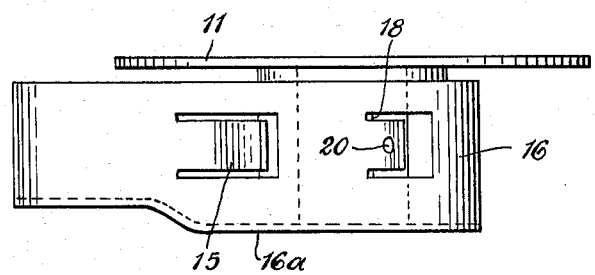

Heinz Küppenbender, Wurttemberg, Germany, assignor to Carl-Zeiss-Stiftung, doing business as Carl Zeiss, Wurttemberg, Germany, a corporation of Germany
Filed Oct. 26, 1964, Ser. No. 406,527
Claims priority, application Germany, Oct. 25, 1963, Z 10,429
6 Claims. (Cl. 352—83)

The invention relates to a motion picture camera and particularly is directed to a film spool therefor which is permanently installed in the camera casing.

The insertion of the individual film spools in motion picture cameras in most instances is rather difficult and time consuming even though the camera user may have acquired some practice in doing it. There have been proposed heretofore film inserting devices which by means of guide members fixedly mounted in the camera casing permit an automatic threading of the film. The film spools used, however, are in customary manner exchangeable and have a conventional construction in which the core of the spool body is provided with two flanges which guide and constrain the film while it is unwound from one spool and wound upon the other. Difficulties are encountered however, when the film spools have to be exchanged and reversed which is the case in conventional 8 mm. narrow film motion picture cameras. These cameras in most instances employ a 16 mm. wide film provided with perforations on both edges. On this film are produced two adjacent rows of images one after the other. In other words, one half of the width of the film is first exposed to a row of pictures and thereafter upon reversing the film spool, the second row of pictures is produced on the other half width of the film. After both halves of the film strip have been exposed and developed, the film is separated along its center line and the two narrow film strips are then joined together to form a single continuous film having perforations along one edge only.

After the film has been moved once through the motion picture camera and has one half of its width exposed, it was heretofore necessary to interrupt the picture taking operation in order to reverse the two film spools in the camera and to arrange them in such a manner that during the second run of the film through the camera the other half width of the film is exposed. This frequently has the result that the beginning of each film strip receives an undesirable exposure. This exposed portion of the film has to be removed later, the more so, since the reversal of the film spools has to take place in daylight. If the reversing of the film spool is done not very carefully, it may happen that a good portion of the film unreels from the film spool and accordingly a longer or shorter piece of the film becomes spoiled.

In order to overcome these disadvantages, it also has been proposed heretofore to provide the motion picture camera with additional optical devices, such as prisms, which effect an exposure of the film to two rows of pictures without necessitating an exchange of the film spools in the camera.

It is an object of the invention to provide a motion picture camera with a permanently installed film spool which is rotatable about a stationary axis, but also is mounted in such a manner that it cannot be removed from its axis without special manipulations. According to the invention, the film spool remains constantly in the motion picture camera. It is possible to make such a film spool adaptable to different types of motion picture cameras. In particular, such a film spool requires only the use of a single flange on one end of its core because the second flange, which is used for preventing a slipping of the film from the core of the spool, is formed either by a cross-like safety member or by a guide plate which is pivotally mounted in the camera casing. Such a spool body provided with a guide plate which always remains in the camera, may also be constructed to serve as an automatic film threader. Additional means may be provided on this guide plate for automatically disconnecting the film feeding device, or it may be used for automatically reversing the direction of movement of the film. In addition, means may be provided for changing the direction of movement of the film and the optical prism device so that in the so called double 8 mm. camera the prism is adjusted for permitting an exposure of the second half of the film without interrupting the picture taking procedure. Finally, this guide plate may be provided with a scanning device which determines and indicates the length of the film which has been exposed.

The invention will now be described with reference to the accompanying drawings in which:

FIG. 1 illustrates a sectional view of a film spool body constructed in accordance with the invention;

FIG. 2 is a side elevation view of the film spool from the right hand side of FIG. 1;

FIG. 3 illustrates in side elevation and partly in section a motion picture camera with a film spool body in accordance with the invention where the film is manually threaded;

FIG. 5 illustrates a film spool body with a film guide flange as it is used in the lower portion of FIG. 4.

Figure 4:
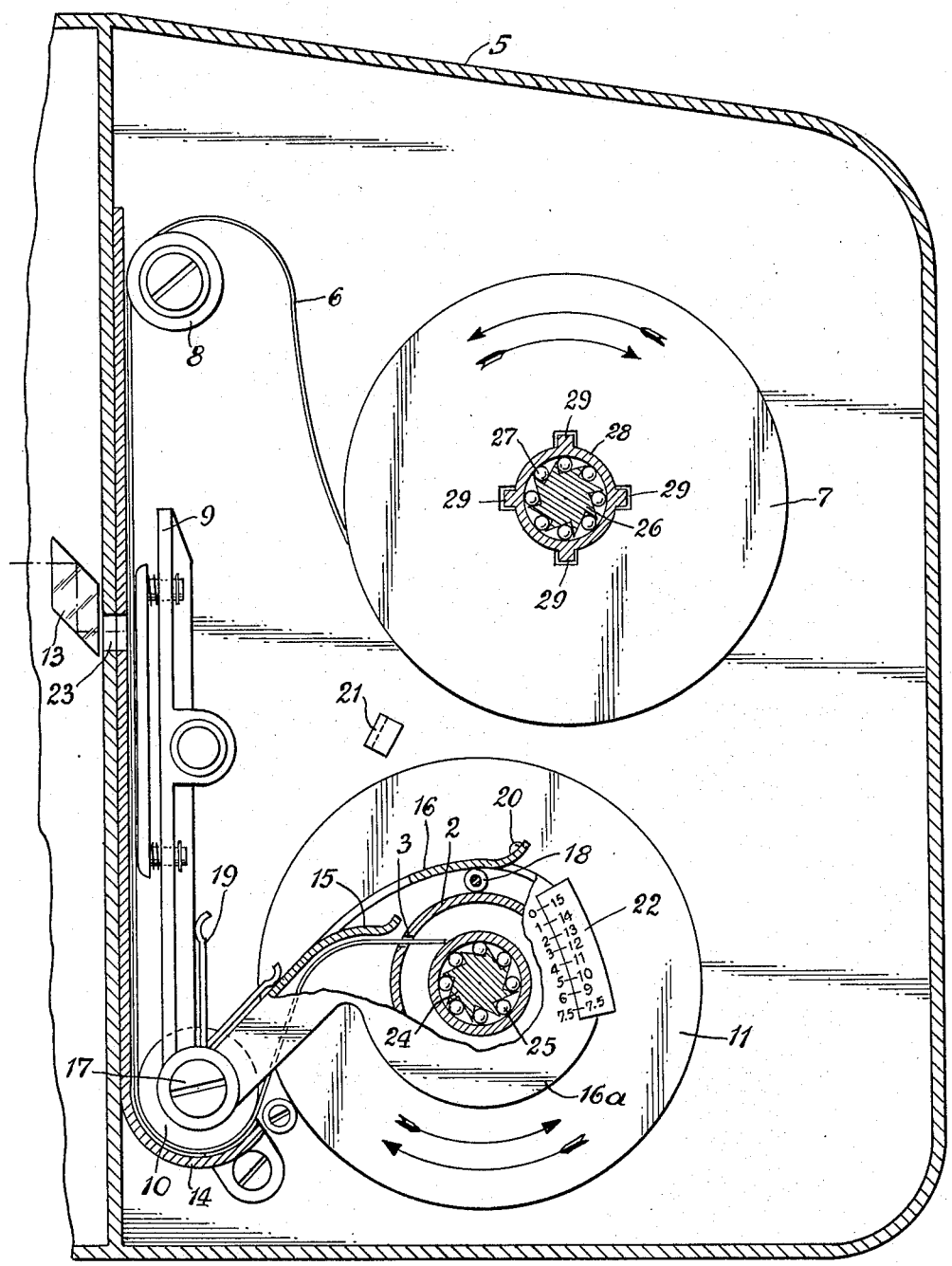
FIG. 4 illustrates a view of a motion picture camera similar to FIG. 3, but with means for effecting an automatic threading of the film.

Referring to the FIGS. 1 and 2, the film spool body comprises a tubular core 2 provided with only one guide flange 1 at one of its ends. This guide flange 1 serves for a lateral support of the film, while the tubular core 2 is provided with an acially extending guide slot 3 which is open at its right hand end. On this right hand end of the spool body is attached a removable safety member 4 provided with four radial arms 4a. This safety member 4 is employed for preventing an unintentional running off of the film from the core of the film spool body. This film spool body has to be inserted with its open right hand side facing outwardly into the motion picture camera. In this manner the film may be inserted also without an automatic threading device as shown in FIG. 3. However, it is also possible with a permanently installed film spool body built in accordance with the invention to provide an automatic film threading by giving the side support for the film a particular form as this is shown by way of example in FIG. 4.

Referring to FIG. 3, the motion picture camera 5 has permanently installed therein a stationary mounted film spool body provided only with one flange 1 on one end so that the film may be inserted manually very easily. The film 6 is unwound from the upper supply spool 7, is guided over an upper roller 8 and into the previously opened film gate 9 and is conducted to a second guide roller 10 and from here to a take-up spool 11 mounted on a shaft 23a. This last named film spool is constructed in accordance with the present invention which means that it has a bore 2 which is freely accessible. The front end of the film is inserted from above in one of the easily accessible slots 3 of the core 2 of the spool body so that this end will be safely attached before the core 2 begins to rotate.

The camera objective is designated with 12 and the prism device which controls the projection of the two rows of pictures on the film 6 and is slidable in vertical direction is designated with 13. The prism device 13 is intended to deflect the light rays passing through the camera objective 12 to the respective half of the film 6.

The motion picture camera illustrated in FIG. 4 is provided with an automatic film inserting device. The start of the film is taken from the film supply spool 7, is threaded over the roller 8 and into the film gate 9. Upon actuating the motor driven film advancing device, the film is moved toward the guide roller 10 and onto a first guide plate 14 and then onto a second guide plate 15. The guide plate 15 leads the start of the film into the axial slot 3 in the core 2 of the spool body and is stamped from a larger curved guide plate 16 on a disc-shaped plate portion 16a which is pivotally mounted about an axis 17 which may be the axis of rotation of the guide roller 10. At any rate, the axis of rotation lies outside of the circumference of the film spool 11. The guide plate portion 16a takes the place of the safety member 4 and performs the function of the missing spool flange of the spool body and prevents the film from sliding off core 2 of the spool body 1, 2. This guide plate 16 is also provided at its forward free end with a pressure roller 18 which by means of a spring 19 acting upon the guide plate 16 is urged against that portion of the film already wound upon the core 2 of the spool body. When the film collects on the take-up spool, the guide plate 16 is pivotally rotated anti-clockwise about the axis 17. The guide plate 16 also carries an electric contact 20 which comes into engagement with a contact 21 on the camera casing when the film on the spool body has reached a predetermined large diameter. This has the result that a not illustrated film spool drive motor is disconnected or is reversed, respectively, as soon as almost the entire film has been taken off the supply spool 3 and only one or a few layers remain thereon.

The film guide plate 16 is constructed in such a manner that it serves at the same time as an indicating device for the length of the film wound upon the lower spool body. For this purpose the film guide plate portion 16a carries a double scale 22 each indicating the length of the film in meters. One of the two scales is covered, however, depending in which direction the film spool body rotates in any one instant. At the same time the direction of rotation of the drive motor is reversed by a closing of the contacts 20, 21, the prism device 13 is displaced in a direction perpendicular to the direction of movement of the film in front of the picture window 23, or this prism device may also be slidably adjusted manually and the same time therewith the direction of rotation of the drive motor will be reversed. In order that the film spool 11 may not only serve as a film take-up spool but also as a film supply spool when the direction of rotation is reversed, in which case the spool 11 will have to be freely rotatable without any drive connection with the driven shafts 24 and 26 associated with the spools 11 and 7, respectively, they are provided each with an overrunning clutch 25, 27 so that the spool 11 in one direction is driven positively as a take-up spool when rotating in clockwise direction. After reversing the rotation of the motor, the upper spool 7 serves as a film take-up spool when driven in opposite direction. The same overrunning clutch is provided for the upper spool except that it operates in the opposite direction of rotation. The clutch ring 28 is provided with radial projections 29 which serve as drive connections for the spool.

FIG. 5 is a view of the lower film spool 11 from above. It is obvious from this figure in what manner the guide plate 15 and the contact carrying member 20 are punched from a plate of sheet material which forms with the guide plate 16 a single piece.

What I claim is:

1. A motion picture camera employing a film of double picture width provided on both edges with perforations and having means for exposing each half of said film one after the other to two rows of pictures which will appear one next to the other on said film, including in said camera a film advancing means and two film spool bodies of which one comprises a conventional spool body, while the other one comprises a cylindrical core provided with only one film engaging flange, said last named spool body being rotatable about a fixed axis in said camera, the other flange of said one film spool body comprising a guide plate which is pivotally mounted about an axis arranged spaced from the axis of rotation of said spool body in said camera, said guide plate including means for automatically stopping said film advancing means and for operating said means for exposing said film to two adjacent rows of pictures one after the other and for reversing the rotation of said two film spool bodies after the film has been exposed to one row of said pictures so that the other half of the film may be exposed to said second row of pictures without interruption.

2. A motion picture camera according to claim 1, wherein the means for automatically stopping includes a roller which engages the film which is taken up by said last named film spool body and which upon reaching a predetermined film spool diameter and a predetermined pivotal movement of said guide plate causes said automatic stopping of said film advancing means and an adjustment of said film exposing means and a reversing of the rotation of said film spool bodies.

3. A motion picture camera according to claim 1, in which each one of said film spool bodies is provided with a drive shaft and with an overrunning clutch which are effective alternatively in opposite direction of rotation so that when one film spool is driven to taken up the film, the other film spool is free wheeling to permit the unwinding of the film.

4. A motion picture camera according to claim 1, including guide portions on said guide plate for effecting an automatic threading of the film.

5. A motion picture camera according to claim 1, including a scale on said guide plate which is visible from the outside of the camera for indicating the length of the film wound upon the film spool body serving as a take-up spool.

6. A motion picture camera according to claim 1, including a scale on said guide plate which is visible from the outside of the camera for indicating the length of the film wound upon the film spool body serving as a take-up spool, and said scale being provided with two adjacent rows of numbers indicating the double length of the film.

References Cited by the Examiner

UNITED STATES PATENTS 2,148,493   2/1939   Nowland _____ 352—83

FOREIGN PATENTS 819,744   9/1959   Great Britain.

JULIA E. COINER, *Primary Examiner.*

NORTON ANSHER, HAROLD H. FLANDERS, W. MISIEK, *Examiners.*